April 3, 1928.  H. F. SCHLEININGER  1,664,793
TOOL FOR RESTORING SCREW THREADS
Filed Oct. 11, 1926
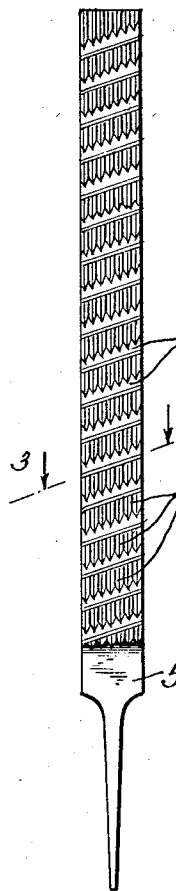
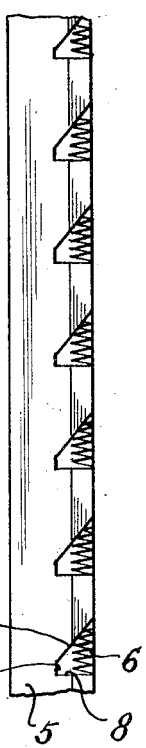
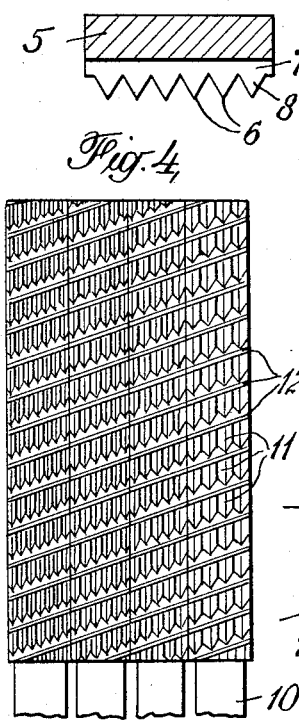
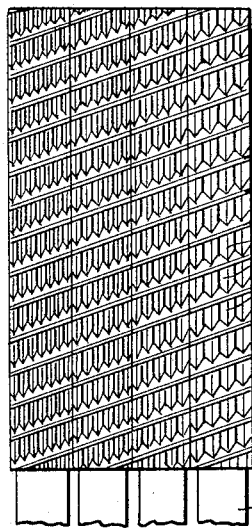
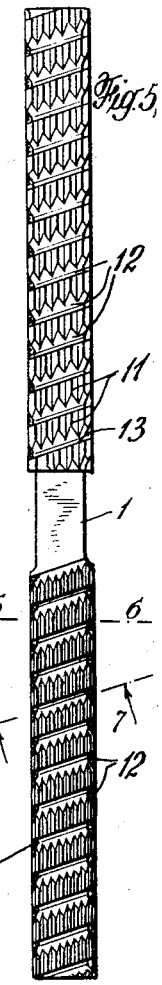
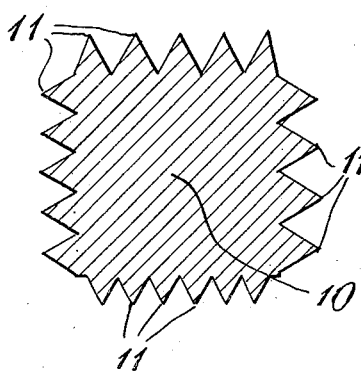
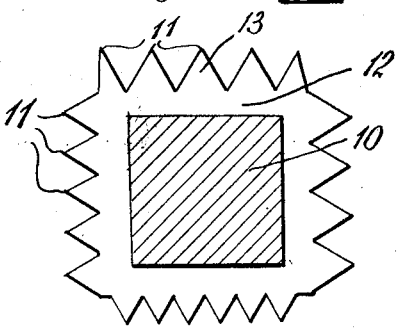
INVENTOR
Henry F. Schleininger
BY
Pennie Davis Marvin & Edmonds
ATTORNEYS Patented Apr. 3, 1928.

1,664,793

UNITED STATES PATENT OFFICE.

HENRY F. SCHLEININGER, OF NEW YORK, N. Y.

TOOL FOR RESTORING SCREW THREADS.

Application filed October 11, 1926. Serial No. 140,698.

This invention relates to tools for restoring the threads on screws, bolts and the like.

The threads on screws, bolts and similar externally threaded elements of machines and other structures are subject to wear and especially to damage resulting from accidental or careless impact of hammers, wrenches and other tools. Frequently the threads are so damaged as to preclude further use of the threaded member and it is consequently discarded. Factories, machine shops and garages, especially, sustain heavy losses as the result of such damage to threads.

It is the object of the present invention to provide a simple and comparatively inexpensive tool whereby threads can be restored easily so that the life of the threaded member can be prolonged.

Other objects and advantages of the invention will be apparent as it is better understood by reference to the following specification and accompanying drawing, in which Fig. 1 is a plan view of a simple form of tool embodying the invention;

Fig. 2 is an enlarged side elevation of a portion of the tool;

Fig. 3 is an enlarged sectional view on the line 3—3 of Fig. 1;

Fig. 4 is a development of a tool having multiple faces;

Fig. 5 is a plan view of the tool as shown in Fig. 4;

Fig. 6 is a section on the line 6—6 of Fig. 5; and

Fig. 7 is a section on the line 7—7 of Fig. 5.

In its elementary form the tool consists of a hardened steel plate or bar having a plurality of longitudinally extending, parallel ridges, shaped and spaced apart to fit a screw thread of given pitch. The ridges are broken at intervals by grooves. These grooves extend across the plate or bar in diagonal relation to the ridges. Each groove has a wall which is normal to the plane in which the upper edges of the ridges lie and an opposite wall which is disposed in acute angled relation thereto. Thus the ridges are provided at each groove with sharp, generally V-shaped cutting edges which are adapted to remove metal constituting a deformity of the screw threads.

In using the tool it is selected from a set, provided for that purpose, and matched with the thread of the screw so that the pitch of the screw and of the tool will coincide. The tool and screw are then moved relatively in the direction which permits the V-shaped cutting edges to engage and remove any superfluous metal from the thread. By arranging the grooves in diagonal relation to the ridges continuous engagement of some of the ridges with the thread is assured. Thus, instead of a jerky movement due to the successive engagement of the thread with the grooves, the movement of the thread over the ridges is smooth. This facilitates the use of the tool and permits the accomplishment of the intended purpose without injury to the threads.

Referring to Figs. 1 and 2 of the drawing, 5 indicates a bar having on one face thereof a plurality of ridges 6 properly spaced and so formed as to cooperate with a thread of given pitch. The diagonal grooves 7 cut the ridges 5 and have walls 8 which are normal to the plane of the tops of the ridges 5. The opposite walls 9 of the grooves are arranged at an acute angle to the walls 8. The ridges 6 are thus provided at each groove with sharp cutting edges.

In the preferred embodiment of the invention as illustrated in Figs. 4 to 7, the tool comprises a bar of rectangular section, the several faces of which are provided with ridges of varying dimensions so that the tool can be used to restore threads of differing pitch. Instead of selecting a separate tool for each thread, the user turns the tool until the proper face is found.

Referring to the drawing, 10 indicates the elongated rectangular bar having ridges 11 on the several faces. Each set of ridges is properly proportioned and spaced to fit a screw of given pitch. The ridges are cut by grooves 12 diagonally disposed for the purpose hereinbefore mentioned. The grooves have walls 13 normal to the plane of the upper edges of the ridges and opposite walls angularly disposed with respect thereto. Each set of ridges is thus provided with a plurality of V-shaped cutting edges which are adapted to remove superfluous metal as the thread and tool are moved relatively.

The tool as hereinbefore described may be used after the manner of a file and it may be embodied in various shapes and forms with one or more cutting faces.

Various changes can be made therefore in the tool without departing from the invention or sacrificing any of the advantages thereof.

I claim:—

A tool for restoring screw threads, comprising a hardened steel bar having on the face thereof a plurality of parallel longitudinally extending ridges spaced and shaped to conform to a thread of given pitch, the ridges being cut at intervals by grooves extending diagonally with respect thereto.

In testimony whereof I affix my signature.

HENRY F. SCHLEININGER.